J. C. TALIAFERRO, D. P. ROBINSON & J. COYLE.
CONVEYING AND TIMING APPARATUS FOR TIMING AND DELIVERING ARTICLES.
APPLICATION FILED JUNE 29, 1916. RENEWED MAR. 9, 1917.
1,242,738.
Patented Oct. 9, 1917.
5 SHEETS—SHEET 2.
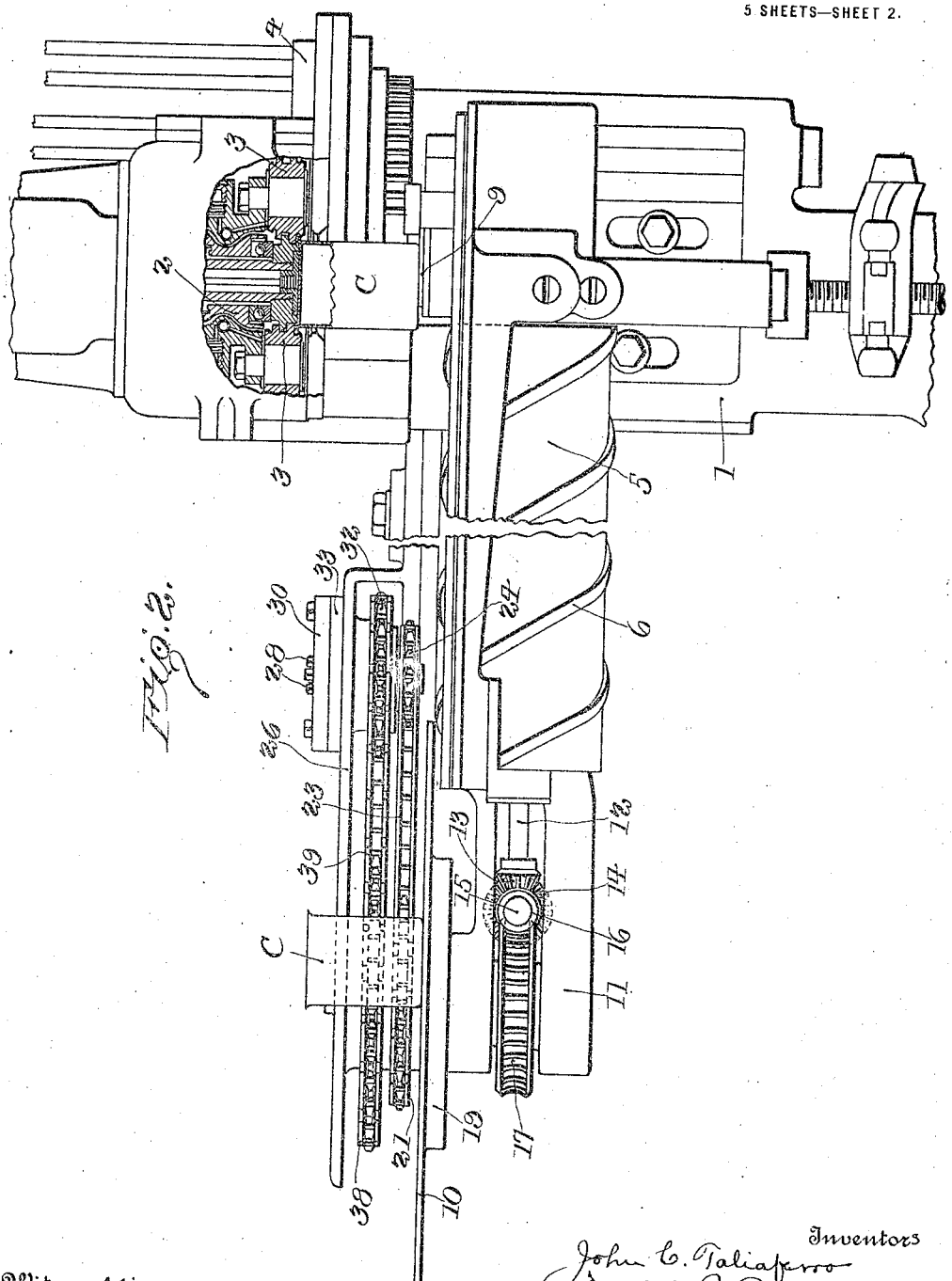

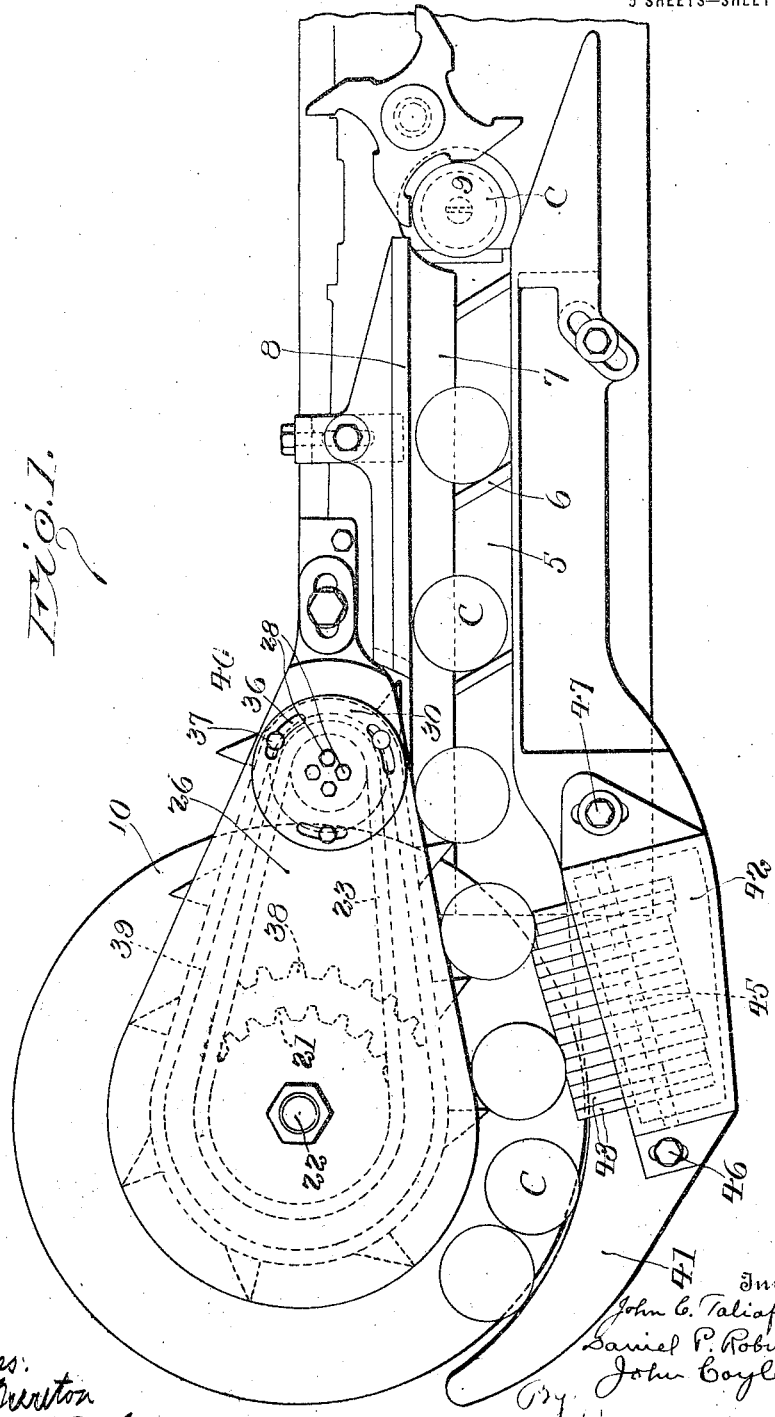

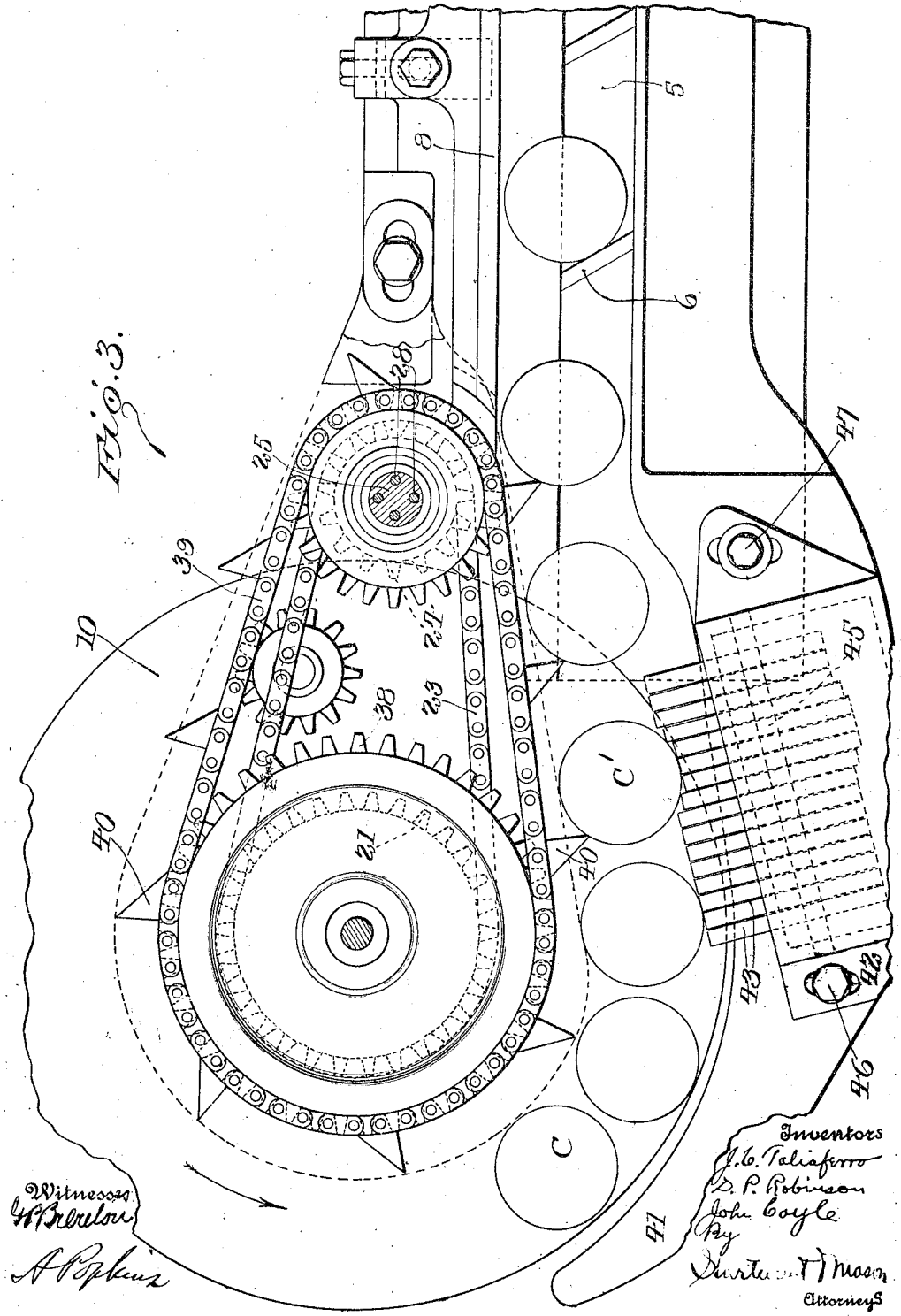

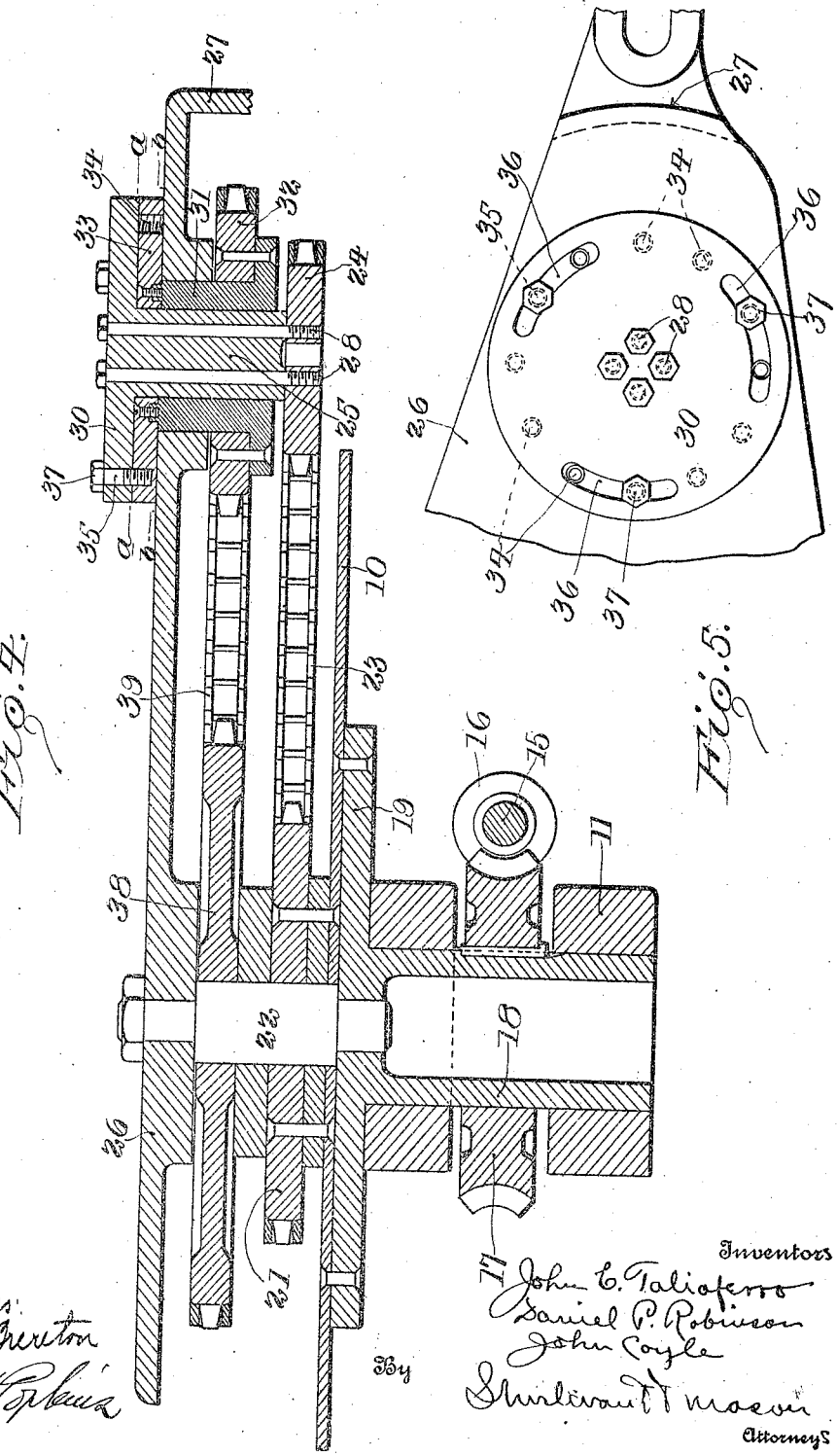

J. C. TALIAFERRO, D. P. ROBINSON & J. COYLE.
CONVEYING AND TIMING APPARATUS FOR TIMING AND DELIVERING ARTICLES.
APPLICATION FILED JUNE 29, 1916. RENEWED MAR. 9, 1917.
1,242,738.
Patented Oct. 9, 1917.
5 SHEETS—SHEET 5.
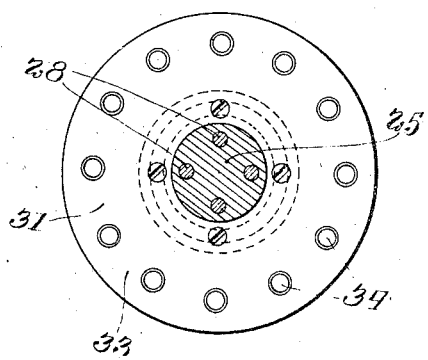
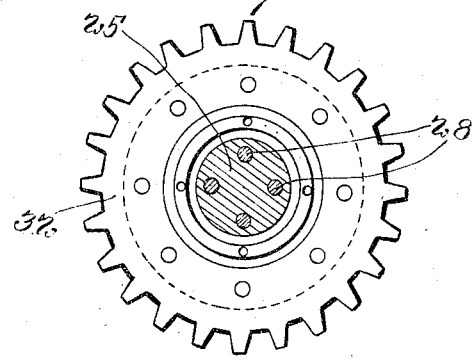
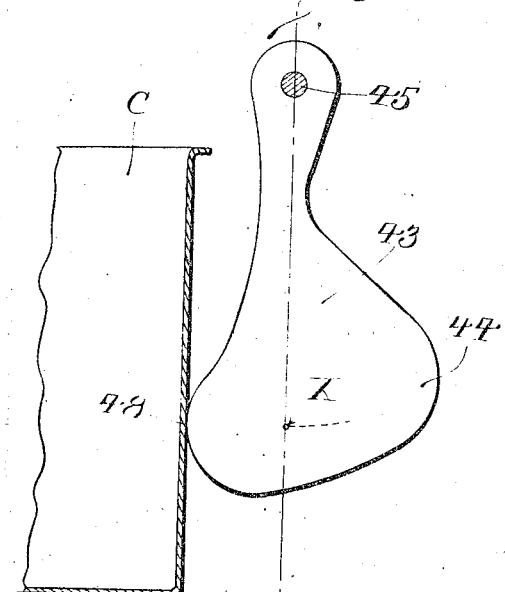
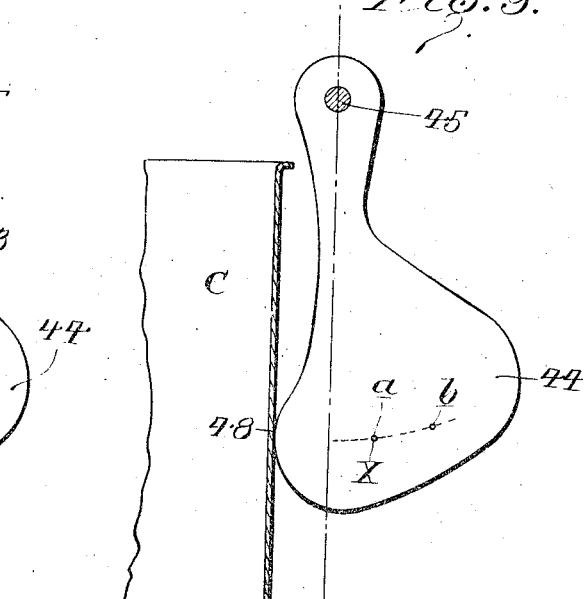
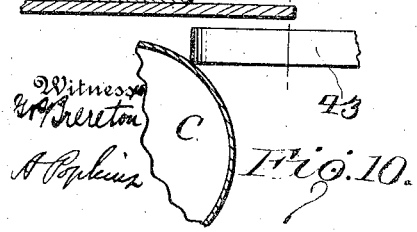
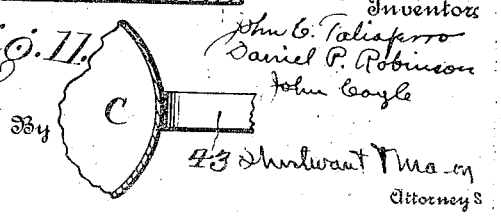

UNITED STATES PATENT OFFICE.

JOHN C. TALIAFERRO, DANIEL P. ROBINSON, AND JOHN COYLE, OF BALTIMORE, MARYLAND, ASSIGNORS TO CONTINENTAL CAN COMPANY, INCORPORATED, OF SYRACUSE, NEW YORK, A CORPORATION OF NEW YORK.

CONVEYING AND TIMING APPARATUS FOR TIMING AND DELIVERING ARTICLES.

1,242,738.     Specification of Letters Patent.     Patented Oct. 9, 1917.

Application filed June 29, 1916, Serial No. 106,705. Renewed March 9, 1917. Serial No. 153,740.

*To all whom it may concern:*

Be it known that we, JOHN C. TALIAFERRO, DANIEL P. ROBINSON, and JOHN COYLE, citizens of the United States, and residents, respectively, of Baltimore, in the State of Maryland, have invented certain new and useful Improvements in Conveying and Timing Apparatus for Timing and Delivering Articles, of which the following is a description, reference being had to the accompanying drawing and to the figures of reference marked thereon.

The invention relates to new and useful improvements in a conveying and timing apparatus for timing and delivering articles at a given point at pre-determined intervals, and more particularly to an apparatus of the above character which may be used for delivering filled cans to a machine for applying the covers thereto and closing the same.

An object of the invention is to provide means coöperating with the timing and delivering devices, which means will place the article in proper relation to the timing devices delivering the articles, said means being so constructed as to be operated by gravity for exerting a varying pressure against the article simultaneously at a plurality of points whereby the article may be retarded or advanced or otherwise moved into proper position relative to the timing device without any quick or abrupt movements of the article.

A further object of the invention is to provide an apparatus of the above character wherein the means coöperating with the timing and delivering devices consists of a plurality of independently supported pivoted members which are arranged to be moved by gravity so as to engage the article, said members being constructed so that a plurality thereof will simultaneously engage the article with varying forces which are at a maximum at a point diametrically opposed to the path of travel of the timing and delivering devices.

These and other objects will in part be obvious and will in part be hereinafter more fully disclosed.

In the drawings, which show by way of illustration, one embodiment of the invention, Figure 1 is a plan view showing an apparatus embodying our improvement, delivering round cans to a conveyer for a closing machine;

Fig. 2 is a side view of the same, with parts omitted, but showing a portion of the closing machine;

Fig. 3 is an enlarged view partly in plan and partly in section, similar to Fig. 1;

Fig. 4 is a vertical sectional view through the timing and delivering mechanism;

Fig. 5 is a plan view showing the means for varying the timing of the delivering fingers;

Fig. 6 is a sectional view on the line *a—a* of Fig. 4;

Fig. 7 is a sectional view on the line *b—b* of Fig. 4;

Fig. 8 is a detail view showing one of the gravity members for exerting a pressure against the can, said member being positioned for minimum pressure;

Fig. 9 is a view similar to Fig. 8 but showing the gravity member swung so that it exerts maximum pressure;

Fig. 10 is a horizontal sectional view with the parts as positioned in Fig. 8; and Fig. 11 is a similar view with the parts positioned as in Fig. 9.

In carrying out the invention, the articles to be timed and delivered are fed promiscuously onto a moving support. Traveling timing devices in conjunction with the moving support engage the cans and carry them forward and deliver the same at predetermined intervals of time at a predetermined point. The traveling timing devices consist of an endless chain or flexible carrier having projecting fingers which are spaced on the chain or flexible carrier at predetermined intervals corresponding to the time intervals that the articles are to be delivered at a given point when said chain or carrier is traveling at a predetermined speed. The articles are fed promiscuously on to the support, which, as shown in the drawings, is a traveling support.

Coöperating with the timing devices for placing the articles in proper relation to the timing devices is a series of independent members, each of which is pivotally mounted, and these members are arranged side by side. Said members are also of such a width so that a plurality thereof engage each article that is to be timed and delivered at the same time.

The device is especially adapted for handling round filled cans. It is well known that if a can is moved suddenly or abruptly, it is liable to spill the contents thereof. Inasmuch as the cans are placed promiscuously on the traveling support, they must be either advanced or retarded, or in some way manipulated so as to place the article in contact with the timing finger. These yielding devices accomplish this result and without any sudden or quick movements of the can. These yielding devices, as herein shown, are in the form of gravity members which are pivoted so they may swing laterally to a normal position of rest, with the center of gravity directly under the pivotal point. Inasmuch as the can is round, when the can first engages these gravity members they will be forced back farther and farther until the maximum diameter of the can is reached. The pressure or force of these gravity members, when first engaged by the can is less than when the devices engaging the can are diametrically opposite from the timing and delivering devices, that is, when they are moved back to their farthest position for exerting maximum pressure. While one member, therefore, is engaging the can with the maximum pressure or force, the members in front and in rear of said members exerting maximum pressure, are likewise engaging the can but with less pressure and this causes a movement of the can, but prevents any sudden forward movement or rearward movement of the can on the support. In other words, these gravity members bring just the desired force against the can to place it in the proper relation to the timing fingers.

Referring more in detail to the drawings:—

The invention is shown as applied to a closing machine having a supporting standard 1, on which is mounted a rotating closing head 2 having seaming rolls 3. This seaming head also has a stack holder 4 in which the covers or ends are stacked, and the covers are fed one at a time underneath the seaming head. The filled cans are conveyed underneath the seaming head by a rotating drum 5 having a projecting thread 6 thereon. The cans are fed onto the drum and a coöperating supporting ledge 7, and the projecting thread slides the cans along the ledge 7 and the guiding rail 8 onto a support 9 underneath the seaming head. These parts are of the usual construction, and further description thereof is not thought necessary.

The improved timing and delivering device, as herein shown, is especially adapted for delivering filled cans to a closing machine of the character described, and this timing and delivering device consists of a rotating support 10 which is pivotally mounted on a bracket 11 carried by the supporting frame of the closing machine which supports the drum 5. The shaft 12 rotating the drum is provided with a beveled gear 13 which meshes with a beveled gear 14 on a cross shaft 15, and this cross shaft 15 carries a gear 16 which meshes with a worm gear 17 splined to a shaft 18. The shaft 18 is mounted in the bracket 11, above referred to, and carries a disk 19 to which the rotating support 10 is riveted.

Directly above the rotating support 10 and secured thereto in any suitable way is a sprocket wheel 21 which rotates about a head 22. An endless chain 23 engages said sprocket and also engages a sprocket wheel 24 fixed to the lower end of a shaft 25 which is mounted in a bracket 26. The bracket 26 is supported at one end of the head 22 and is carried at the other end by an arm 27 which is fixed to the supporting frame of the closing machine. The shaft 25 is bolted to the gear 24 by suitable bolts 28. Fixed to the upper end of the shaft 25 and, as herein shown, formed integral therewith is a cap 30. Surrounding the shaft 25 is a hub 31 which carries a gear 32. The hub 31 is fixed to a disk 33. Said disk has a series of threaded openings 34 which are adapted to receive bolts 35. Each of these bolts 35 extends through a segmental slot 36 formed in the cap 30. By loosening the nuts 37 on the bolts 35, the disk 33 may have an angular adjustment relative to the cap plate 30. Mounted on the head 22 is a gear wheel 38. A traveling conveyer chain 39 coöperates with the sprocket wheels 38 and 32. This endless chain conveyer is provided with projecting fingers 40 which are equally spaced on the conveyer chain and will be referred to hereafter as the timing devices.

The filled cans or other articles to be delivered are fed one at a time onto the rotating support 10. This support rotates in the direction of the arrow, as shown in Fig. 3. A guide 41 coöperates with the rotating support and endless conveyer so that the can bodies are delivered to the receiving drum 6 of the closing machine. If each can body rests against a timing finger, then the can bodies will be presented to the drum so as to be taken by the drum without any stopping of the can body. In other words, the can body will have a substantially continuous movement, and this prevents the spilling of the contents of the can which results when the filled can is stopped and again started.

Our improvement is directed particularly to the means which places the can bodies in proper relation to the timing fingers.

These can bodies, as above noted, are fed promiscuously onto the rotating support. This means consists as herein shown, of a supporting bracket 42 which is provided with a series of gravity members 43 arranged side by side. These gravity members are shown in detail in Figs. 8 and 9 and consist of an enlarged portion 44, the center of gravity of which is indicated at X. The gravity members are pivoted on a supporting bar 45 carried by the bracket 42. Said bracket 42 is secured by clamping bolts 46 and 47. The bracket 42 is slotted so as to permit adjustment thereof when the bolts 46 and 47 are loosened. This permits the setting of the bracket and the gravity members carried thereby for different size cans.

In Fig. 8 of the drawings we have shown the can indicated at C bearing against the rounded nose 48 of the gravity member.

In Fig. 10, we have shown a plan view of the position of the can and the gravity member and from this figure it will be apparent that the curved portion of the can first engages the gravity member at some distance in front of the center of the can relative to its direction of travel. As the can moves forward the gravity member will be moved back until the center of the can lies in the plane of the gravity member, as shown in Figs. 9 and 11. As the gravity member swings back, the center of gravity, indicated at X, is raised. When the center of gravity is at the point indicated at $b$ in Fig. 9, the pressure of the gravity member against the can will be much greater than it would if the center of gravity were at the point $a$, while, when the gravity member is at the position shown in Fig. 8, that is, directly under the pivotal point 45, there is substantially no pressure of the same against the can. In other words, the pressure of these gravity members increases from the point where the can is first engaged until the gravity member reaches the maximum diameter of the can. These gravity members are of much less width than the diameter of the can so that a plurality of gravity members are simultaneously engaging the can before the can passes said gravity members.

It often happens that a can when fed to the timing and delivering devices engages the end of one of the timing fingers, but with the center of the can well in front of the finger. In order that the can may be properly positioned relative to the timing finger, it will have to be moved forward slightly, and the gravity members accomplish this movement of the can and without any sudden or abrupt shifting of the can. When the can first engages the gravity members, a light pressure is exerted against the can, which pressure is in front of the center of the can, while the finger engages the can in rear of the center. The direction of the pressure and the extent thereof is not sufficient to roll the can forward into proper position relative to the finger. As the can moves on other gravity members are brought into engagement therewith until finally a maximum pressure is exerted against the can by the gravity member which is in a plane passing through the center of the can and at right angles to its direction of travel, which will be referred to as the position of maximum diameter.

The pressure is now sufficient to roll the can forward on the timing finger so as to bring it against the edge of the bracket 26 which serves as a guide roll. This forward movement, however, of the can relative to the finger is in a sense retarded by the gravity members which are in advance of the one exerting a maximum pressure, and this results in a relatively slow and easy movement of the can into proper position relative to the timing finger.

If the timing finger had engaged the can at a distance slightly in advance of its center, then the gravity members would retard the movement of the can, holding it back until the next timing finger comes into position engagement therewith and forces it forward. This retarding force against the can, however, is a gradual, instead of a sudden, force owing to the fact that there is practically no pressure of the gravity members against the can when first engaged thereby and this pressure gradually increases to a maximum. As a consequence, the retarding force on the can is at first of little or no effect, and this gradually increases to a maximum and at no time is it sufficient to bring the can to a complete stop, the can rolling along the gravity members at a retarded rate of travel until the timing finger engages the same and positively moves it forward. Under these conditions, the can is placed against the timing device without any sudden movement or without stopping the same, which would result in a sudden movement when the timing finger positively engages the can, and, therefore, there is little or no spilling of the contents of the can as our improved gravity members operate upon the can one after the other to position them relative to the timing fingers.

The distance between the gravity members, when in their full forward position, and the guide along which the cans are moved by the timing devices, is less than the diameter of a can. This distance is also greater at the receiving end of the gravity members than at the delivery end of the gravity members. The bracket 42 may be shifted to vary the position of the gravity members for different sized cans, as has been noted above.

The gears 34 and 32, as shown in the drawings, are so proportioned that the timing fingers travel slightly faster than the rotating support. This is not, however, an essential feature of the invention. By adjusting the position of the disk 33 relative to the cap 30, the timing of the fingers may be changed, that is, the cap 30 is rotated through a train of mechanism connected with the conveyer drum of the closing machine and by shifting the disk 33 relative to the cap, the time when the fingers deliver a can in contact therewith to the drum may be varied so that the drum may be caused to pick up the can and carry it along without the can coming to a stop.

While we have shown and described our invention as applied to an apparatus for delivering filled cans to a closing machine, it will be understood that our improved conveying and timing apparatus may be used for conveying articles of any character to a machine or to a given point of delivery at predetermined intervals of time.

It is obvious that minor changes in the details of construction and the arrangement of parts may be made without departing from the spirit of the invention, as set forth in the appended claims.

Having thus described the invention, what we claim as new and desire to secure by Letters Patent is:

1. A conveying and timing apparatus for timing and delivering articles at a given point at predetermined intervals of time comprising traveling timing and delivering devices, and means coöperating therewith for placing the articles in proper relation to said timing devices, said means being constructed so as to operate by gravity with a yielding pressure against an article simultaneously at a plurality of points for placing said article in proper position relative to the timing devices.

2. A conveying and timing apparatus for timing and delivering articles at a given point at predetermined intervals of time comprising traveling timing and delivering devices, and a plurality of gravity operated members independently mounted and arranged side by side and coöperating with the traveling devices for placing the articles in proper relation to said timing devices.

3. A conveying and timing apparatus for timing and delivering articles at a given point at predetermined intervals of time comprising traveling timing and delivering devices, and a plurality of gravity operated pivoted members independently mounted and arranged side by side and coöperating with the traveling devices for placing the article in proper relation to said timing devices, said gravity members being so constructed as to engage an article simultaneously at a plurality of points.

4. A conveying and timing apparatus for timing and delivering articles at a given point at predetermined intervals of time comprising traveling timing and delivering devices, and a plurality of separate and independently pivoted devices arranged side by side and coöperating with the timing and delivering devices for placing the articles in proper relation to said timing devices, said pivoted devices being so constructed and arranged as to operate by gravity to exert a pressure against the articles being shifted into proper relation with the timing devices.

5. A conveying and timing apparatus for timing and delivering articles at a given point at predetermined intervals of time comprising traveling timing and delivering devices, and a plurality of separate and independently pivoted devices arranged side by side and coöperating with the timing and delivering devices for placing the articles in proper relation to said timing devices, said pivoted devices being so constructed and arranged as to operate by gravity to exert a pressure against the articles being shifted into proper relation with the timing devices, said gravity members being so constructed as to engage an article simultaneously at a plurality of points.

6. A conveying and timing apparatus for delivering filled cans to a closing machine including in combination traveling timing fingers, a guide associated therewith, a support for the cans, means for placing the cans against the guide and timing fingers, said means including a plurality of gravity members arranged side by side, said gravity members being opposed to the traveling timing fingers for engaging the can and forcing the same into proper relation thereto.

7. A conveying and timing apparatus for delivering filled cans to a closing machine including in combination, traveling timing fingers, a guide associated therewith, a rotatable support adapted to receive the filled cans promiscuously, means coöperating therewith for placing the cans against the timing fingers and guides, said means including a plurality of gravity operated pivoted members arranged side by side, said members being passed to the traveling timing fingers and operating to force the cans into engagement with the timing fingers and the guide without stopping the movement of the can.

8. A conveying and timing apparatus for delivering filled cans to a closing machine including in combination, traveling timing fingers, a guide associated with the timing fingers, a rotatable support adapted to receive the filled cans promiscuously, and means coöperating therewith for placing the cans against the guide and timing fingers, said means including a plurality of gravity operated members arranged side by side and opposed to the guide, said members being so constructed that a plurality thereof engage each can at the same time.

9. A conveying and timing apparatus for delivering filled cans to a closing machine including in combination, traveling timing fingers, a guide associated with the timing fingers, a rotatable support adapted to receive the filled cans promiscuously, and means coöperating therewith for placing the cans against the guide and timing fingers, said means including a plurality of gravity operated members arranged side by side and opposed to the guide, said members being so constructed that a plurality thereof engage each can at the same time, said members being arranged so as to engage the can as it is moved along the gravity members with increasing pressure.

In testimony whereof, we affix our signatures, in the presence of two witnesses.

JOHN C. TALIAFERRO.
DANIEL P. ROBINSON.
JOHN COYLE.

Witnesses:
 WM. J. DELCHER,
 NELLIE T. RYAN.